US012568146B2

(12) United States Patent
Tsuji et al.

(10) Patent No.: US 12,568,146 B2
(45) Date of Patent: Mar. 3, 2026

(54) DATA RELAY DEVICE FOR VEHICLE

(71) Applicant: TOYOTA JIDOSHA KABUSHIKI KAISHA, Toyota (JP)

(72) Inventors: Keisuke Tsuji, Nisshin (JP); Madoka Hayashiguchi, Toyota (JP); Kaho Nakamura, Seto (JP); Kei Morizumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/760,473

(22) Filed: Jul. 1, 2024

(65) Prior Publication Data

US 2025/0119473 A1 Apr. 10, 2025

(30) Foreign Application Priority Data

Oct. 6, 2023 (JP) .................................. 2023-174399

(51) Int. Cl.
*H04L 67/00* (2022.01)
*G06F 8/65* (2018.01)
*H04L 67/12* (2022.01)

(52) U.S. Cl.
CPC ................ *H04L 67/34* (2013.01); *G06F 8/65* (2013.01); *H04L 67/12* (2013.01)

(58) Field of Classification Search
CPC ............ H04L 67/34; H04L 67/12; G06F 8/65
See application file for complete search history.

(56) References Cited

U.S. PATENT DOCUMENTS

2021/0168219 A1* 6/2021 Masuda .............. H04L 67/2866
2024/0303071 A1* 9/2024 Kuwabara ................. G06F 8/65

FOREIGN PATENT DOCUMENTS

JP 6954460 B2 10/2021

* cited by examiner

*Primary Examiner* — Suraj M Joshi
(74) *Attorney, Agent, or Firm* — SoraIP, Inc.

(57) ABSTRACT

The relay device includes multiple communication ports to which the in-vehicle ECU can be connected, a CPU, and a port storage area for each communication port. CPU can perform a reprogramming process for multiple in-vehicle ECUs in parallel. CPU performs: receiving a list of update data that has not been sent to the in-vehicle ECU and a data volume for each of the update data that has not been sent to the in-vehicle ECU; acquiring a rate of increase in free space for each port storage area during the reprogramming process; determining, as the priority update data, update data to be received out of the update data listed in the list based on the data volume for each of the update data and the rate of increase in free space for each of the port storage areas; and sending, to the providing device, a signal requesting the priority update data.

1 Claim, 2 Drawing Sheets

FIG. 3

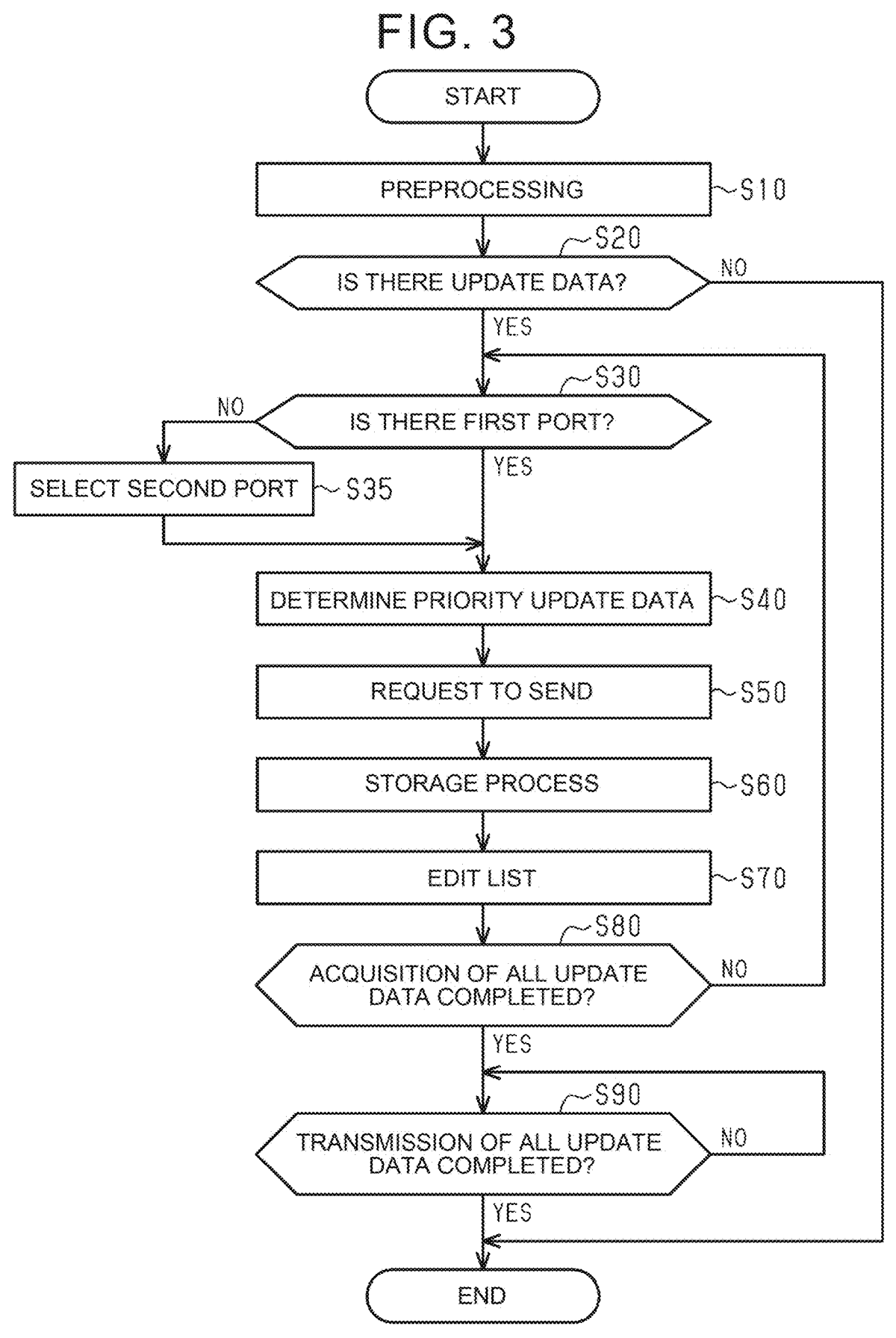

START

PREPROCESSING ~S10

IS THERE UPDATE DATA? ~S20 — NO

YES

IS THERE FIRST PORT? ~S30 — NO

SELECT SECOND PORT ~S35

YES

DETERMINE PRIORITY UPDATE DATA ~S40

REQUEST TO SEND ~S50

STORAGE PROCESS ~S60

EDIT LIST ~S70

ACQUISITION OF ALL UPDATE DATA COMPLETED? ~S80 — NO

YES

TRANSMISSION OF ALL UPDATE DATA COMPLETED? ~S90 — NO

YES

END

DATA RELAY DEVICE FOR VEHICLE

CROSS-REFERENCE TO RELATED APPLICATION

This application claims priority to Japanese Patent Application No. 2023-174399 filed on Oct. 6, 2023, incorporated herein by reference in its entirety.

BACKGROUND

1. Technical Field

The present disclosure relates to data relay devices for vehicles.

2. Description of Related Art

A relay device disclosed in Japanese Patent No. 6954460 (JP 6954460 B) can communicate with a providing device and a destination device. The relay device relays data transmission from the providing device to the destination device. The relay device includes a buffer for temporarily storing data. While the relay device is relaying data transmission, the relay device estimates the data reception rate of the destination device based on a change in free space of the buffer. The relay device sends an optimal data transfer rate to the providing device based on the estimated data reception rate.

SUMMARY

Such a technique of relaying data from a providing device to a destination device as described in JP 6954460 B is sometimes used to update software on a plurality of electronic control units (ECUs) mounted on a vehicle. For example, the vehicle includes a relay device to which a plurality of communication lines is connected. One or more ECUs are connected to each communication line. The relay device sends individual update data sent from the providing device to the communication lines to which the ECUs to be updated are connected. In the above configuration in which the plurality of communication lines is connected to the relay device, the communication speed may vary depending on the communication line due to a difference in standard between or among the communication lines etc. In this case, when the relay device sends the individual update data to the destination ECUs, the update data to the ECU connected to the communication line with a low transfer rate may become stagnant in the relay device. If too much update data is stagnant in the relay device, the buffer of the relay device runs out of space. Accordingly, there is a risk that the update data may be erased from the buffer before being sent to the ECU to be updated.

In order to address the above issue, a data relay device for a vehicle according to the present disclosure includes a plurality of communication ports to which in-vehicle ECUs are connectable, and is configured to receive update data for the individual in-vehicle ECUs from a providing device.

The data relay device includes an execution unit, and storage areas for the individual communication ports.

The execution unit is configured to execute a reprogramming process and execute the reprogramming process on the in-vehicle ECUs in parallel, the reprogramming process being a process of temporarily storing the update data received from the providing device in the storage area corresponding to the communication port to which the in-vehicle ECU to which the update data is to be sent is connected, and sending the update data stored in the storage area to the in-vehicle ECU via the communication port.

The execution unit is configured to receive a list of pieces of the updated data that have not been sent to the in-vehicle ECUs and data volumes of the individual pieces of the updated data that have not been sent to the in-vehicle ECUs, acquire rates of increase in free space of the individual storage areas during the reprogramming process, determine a piece of the update data to be received out of the pieces of the update data in the list to be priority update data, based on the data volumes and the rates of increase in the free space, and send a signal requesting the priority update data to the providing device.

With the above technical idea, it is possible to reduce or eliminate the risk that the update data may be erased before being sent to the in-vehicle ECU to be updated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating a processing procedure of the parallel reprogramming processing.

DETAILED DESCRIPTION OF EMBODIMENTS

Overall Configuration

Figure 1:
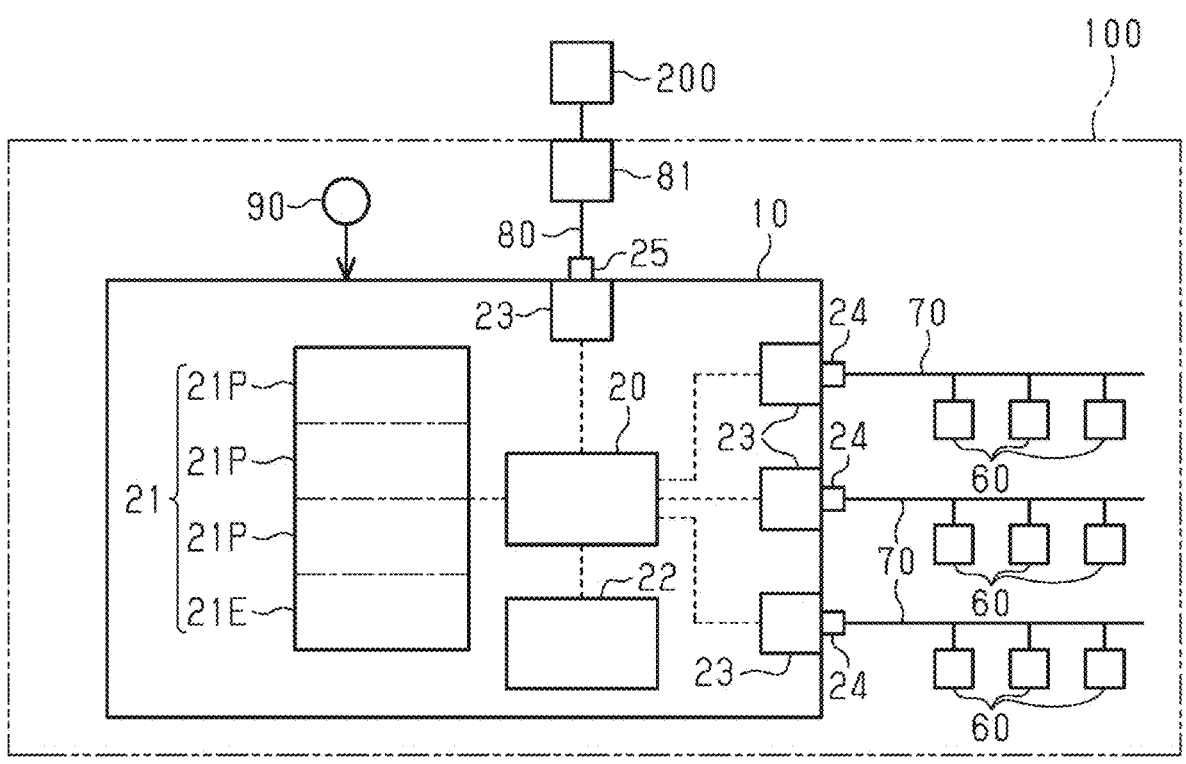
FIG. 1 is a schematic configuration diagram of a vehicle.

Hereinafter, an embodiment of a data relay device for a vehicle will be described with reference to the drawings. As illustrated in FIG. 1, the vehicle 100 includes a data relay device (hereinafter, abbreviated as relay device 10), a plurality of in-vehicle ECU 60, a plurality of internal communication lines 70, an external communication line 80, a connector 81, and a start switch 90.

The relay device 10 includes a CPU 20, a first memory 21, a second memory 22, a plurality of communication controllers 23, a plurality of communication ports 24, and an external port 25.

The CPU 20 is an execution unit. The first memory 21 is a volatile storage medium. The second memory 22 is a non-volatile storage medium. The second memory 22 stores in advance various programs in which processes to be executed by the CPU 20 are described, and various types of data required for the CPU 20 to execute the various types of programs.

In addition, the CPU 20 executes various programs using the first memory 21 as a working storage area. The communication ports 24 are connected to the CPU 20 via individual communication controllers 23. Although FIG. 1 illustrates an example in which the relay device 10 includes three communication ports 24, the number of communication ports 24 is not limited to three.

The external port 25 is connected to the CPU 20 via the communication controller 23. The communication port 24 and the external port 25 are components for connecting a communication line from the outside to the relay device 10. The communication controllers 23 sends data to the outside of the relay device 10 in response to a command from the CPU 20, and transfer data received from the outside of the relay device 10 to the CPU 20. Although not shown, the relay device 10 includes a real-time clock which is a circuit for generating the date and time.

The connector 81 is connected to the external port 25 via an external communication line 80. The connector 81 is capable of attaching and detaching a providing device 200, which will be described later.

The internal communication line 70 is provided for each communication port 24. One internal communication line 70 is connected to one communication port 24. One or more in-vehicle ECU 60 are connected to one inner communication line 70. Therefore, each in-vehicle ECU 60 connected to one internal communication line 70 is connected to the communication port 24 via the internal communication line 70. In other words, one or more in-vehicle ECU 60 are connected to one communication port 24.

The in-vehicle ECU 60 is an electronic control unit having an in-vehicle device as a control target. The plurality of in-vehicle ECUs 60 is controlled by individual in-vehicle devices. An example of the in-vehicle device is an engine serving as a driving source of the vehicle 100. In addition, examples of the in-vehicle device include a brake device, a touch panel display device, an air conditioner, and a meter display device. Note that ECU identification value, which is an individual identification value, is assigned to the respective in-vehicle ECU 60. The CPU 20 of the relay device 10 can identify the respective in-vehicle ECU 60 by ECU identification value.

The start switch 90 may also be referred to as a system start switch. The start switch 90 is turned on or off in response to a user operation. When the start switch 90 is in the on-state, the relay device 10 and the in-vehicle ECU 60 are in the on-state. Here, the "on-state" refers to a state in which the relay device 10 and the devices of the electric machine and communication system including the in-vehicle ECU 60 are activated, and includes a state in which, for example, an engine or the like is not driven. That is, the "on state" includes a so-called accessory-on state. The start switch 90 outputs an on/off signal corresponding to a user operation to the relay device 10.

Providing Device

For example, a providing device 200 is provided in an assembly factory of a vehicle. The providing device 200 is an information processing device for providing update data to the vehicle 100. The updated data is data for reconfiguring the program of the in-vehicle ECU 60. The reconstruction of the program is to rewrite or update the program. The providing device 200 includes the CPU 20, various memories, and the like, similar to the relay device 10. The providing device 200 is attachable to and detachable from the connector 81 of the vehicle 100.

The providing device 200 stores a plurality of pieces of update data in advance. The providing device 200 stores update data about various in-vehicle ECU 60 for various vehicle types. In addition to the main-source code that is essential for the reconstruction of the program of the in-vehicle ECU 60, various types of supplementary information that do not directly participate in the implementation of the reconstruction are attached to the updated data. An example of the supplementary information is type information indicating the type of data. The type information is represented by identification values assigned to various types of data, such as updated data and message data for exchanging information between different in-vehicle ECU 60. An example of the supplementary information is destination information. The destination information is represented by ECU identification value of the in-vehicle ECU 60 to be sent. An example of the ancillary information is a transmission priority level. The transmission priority level is information indicating the priority of transmission when the relay device 10 performs data transmission. The higher the transmission priority level, the higher the priority of data transmission. As the transmission priority level, a plurality of stages is set in advance. Any one of the transmission priority levels in the plurality of stages is attached to the update data as incidental information.

The providing device 200 stores the update data list in advance. The update data list is a list of update data for each in-vehicle ECU 60 stored in the providing device 200. In the update data list, ECU identification value of the in-vehicle ECU 60 to which the update data is to be applied is used as an index indicating the update data of the in-vehicle ECU 60. That is, the update data list is a list of ECU identifiers for each update data. In the update data list, the data volume of the respective update data is also described in association with ECU identifier. In other words, the update data list is obtained by arranging the data sets of ECU identification value and the data volume for each update data. Hereinafter, this data set is referred to as a specific data set. For example, in the update data list, the specific data sets for each update data are arranged in descending order of the data volume of the update data.

Figure 2:
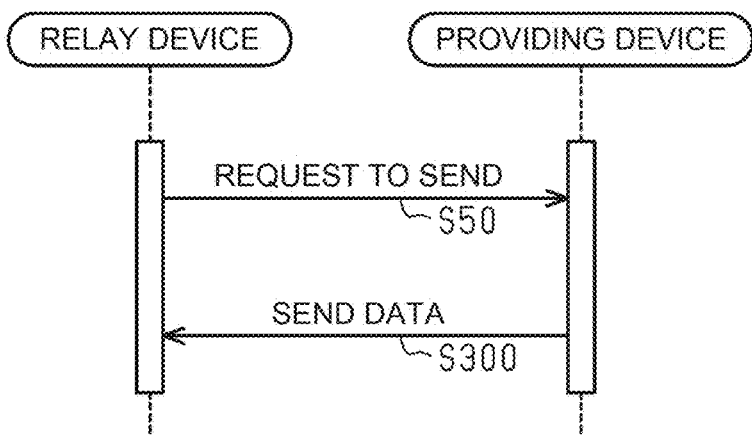
FIG. 2 is a sequential diagram relating to the transfer of updated data.

The providing device 200 is capable of executing various response processes. For example, as illustrated in FIG. 2, the providing device 200 sends update data to the relay device 10 in response to a request from the relay device 10. Further, the providing device 200 sends the update data list to the relay device 10 in response to a request from the relay device 10.

Details of First Memory

As illustrated in FIG. 1, the first memory 21 of the relay device 10 include a plurality of port storage areas 21P. The port storage area 21P is provided for each communication port 24. In FIG. 1, three port storage areas 21P are shown corresponding to three communication ports 24. The plurality of port storage areas 21P are individual storage areas allocated in advance to the first memory 21. One port storage area 21P is paired with one communication port 24. The port storage area 21P is provided in relation to the relay function of the CPU 20. That is, the CPU 20 relays transmission and reception of updated data from the providing device 200 to and from the respective in-vehicle ECU 60, and relays transmission and reception of messaging data between different in-vehicle ECU 60. The port storage area 21P is a storage area for temporarily storing the data when the CPU 20 relays the data to which the in-vehicle ECU 60 connected to the communication port 24 paired with itself is to be sent.

The first memory 21 includes an editing storage area 21E. The editing storage area 21E is one of the storage areas allocated in advance to the first memory 21 as in the case of the port storage area 21P. The editing storage area 21E is a storage area for temporarily storing data to be generated or edited when the CPU 20 executes various processes.

Transmission and Reception Processing

When the relay device 10 and the in-vehicle ECU 60 are activated, the CPU 20 performs a transmission/reception process for each port storage area 21P. The details of the transmission/reception process will be described for a single port storage area 21P. In the transmission and reception process, the CPU 20 sends the data stored in the port storage area 21P to the communication line 70 via the communication port 24 corresponding to the port storage area 21P. When sending each piece of data, the CPU 20 sends the data in order from the highest transmission priority level based on the transmission priority level assigned to each piece of data. The CPU 20 sends data with priority given to data having the same transmission priority level, the data having the earlier date and time stored in the port storage area 21P. The CPU 20 also deletes the sent data as part of the transmission/reception process. That is, when the CPU 20 receives a completion signal indicating completion of reception of data from the in-vehicle ECU 60 to be sent, it deletes the data that has been sent from the port storage area 21P.

Here, the data stored in the port storage area 21P includes message data between different in-vehicle ECU 60. That is, the data stored in the port storage area 21P includes data received from the respective in-vehicle ECU 60. As in the case of the update data, the message data includes various types of additional information such as type information, destination information, and a transmission priority level. When receiving message data from one in-vehicle ECU 60, the CPU 20 stores the message data in a certain port storage area 21P in the same manner as in S60 described later, based on the destination information and the like. The CPU 20 may relay transmission and reception of message data during a parallel reprogramming process to be described later.

Parallel Reprogramming Process

For example, in an assembly plant of a vehicle, programs of respective in-vehicle ECU 60 mounted on the vehicle 100 may be simultaneously reconfigured. As a process for performing such simultaneous reconfiguration, the CPU 20 of the relay device 10 can execute a parallel reprogramming process. The parallel reprogramming process is a process for performing a reprogramming process on a plurality of in-vehicle ECU 60 mounted on the vehicle 100 in parallel. The reprogramming process is the following process for one in-vehicle ECU 60. In the reprogramming process, the CPU 20 temporarily stores the update data received from the providing device 200 in the port storage area 21P corresponding to the communication port 24 to which the in-vehicle ECU 60 to which the update data is to be sent is connected. Then, the CPU 20 sends the updated data stored in the port storage area 21P to the in-vehicle ECU 60 via the communication port 24. The CPU 20 monitors the free space for each port storage area 21P while the parallel reprogramming process is being executed. To monitor the free space for each port storage area 21P, specifically, information on the free space for each port storage area 21P is acquired at the respective timings, and information on the acquired free space is stored in the editing storage area 21E over time. The free space in one port storage area 21P is the maximum storage capacity of the port storage area 21P minus the total volume of data currently stored in the port storage area 21P.

Details of the parallel reprogramming process will be described. On the assumption that the providing device 200 is connected to the connector 81 and that the start switch 90 is in the ON state, the CPU 20 starts the parallel reprogramming process in response to the operator performing a predetermined operation on the providing device 200. As described above, during the parallel reprogramming process, since the in-vehicle ECU 60 is activated, the above transmission and reception process is performed in parallel with the parallel reprogramming process.

As shown in FIG. 3, when the CPU 20 starts the parallel reprogramming process, it first performs S10 process. In S10, the CPU 20 performs pre-processing. In this preprocessing, the CPU 20 requests the providing device 200 to send the update data list and receives the update data list from the providing device 200 as a reply to the transmission request. Then, the CPU 20 stores the received updated data list in the editing storage area 21E of the first memory 21. Thereafter, the CPU 20 edits the updated data list. Specifically, the CPU 20 erases, from among the plurality of specific data sets listed in the updated data list, those other than the specific data sets targeted for the respective in-vehicle ECU 60 mounted on the vehicle 100. As a consequence of this, the updated data list after editing is obtained by enumerating only the specified data sets for the respective in-vehicle ECU 60 mounted on the vehicle 100. The CPU 20 can grasp the in-vehicle ECU 60 mounted on the vehicle 100 based on the connected ECU information stored in the second memory 22. The connected ECU information is a list in which ECU identification values of the in-vehicle ECU 60 connected to the respective communication ports 24 are arranged for each communication port 24. For example, the CPU 20 generates connected ECU information based on connection signals sent from the respective in-vehicle ECU 60 when the start switch 90 is switched on, and stores them in the second memory 22. After editing the updated data list, the CPU 20 advances the process to S20. With regard to S10 process, the CPU 20 receives the updated data list from the providing device 200. This information is a list of update data that has not been sent to the in-vehicle ECU 60 mounted on the vehicle 100, and the data volume of each update data that has not been sent.

In S20, the CPU 20 determines whether or not there is a particular data set in the updated data list after editing. In other words, the CPU 20 determines whether or not the update data targeted for the respective in-vehicle ECU 60 mounted on the vehicle 100 and not yet sent to the in-vehicle ECU 60 is listed in the updated data list after editing. With this determination, the CPU 20 confirms that the specified data set remains in the updated data list after editing, and then advances the process. That is, when the determination is negative (S20: NO), the CPU 20 ends the series of processes of the parallel reprogramming process. On the other hand, if the determination is affirmative (S20: YES), the CPU 20 advances the process to S30.

In S30, the CPU 20 determines whether or not there is a first port, which is the communication port 24 that satisfies a predetermined criterion. The first port is a communication port 24 that satisfies all of the following three conditions (A1) to (A3) out of the plurality of communication ports 24.

(A1) The communication port 24 to which one or more incomplete ECU are connected.

(A2) The current free space in the port storage area 21P corresponding to the communication port 24 is equal to or larger than the first specified value.

(A3) The current rate of increase in free space in the port storage area 21P corresponding to the communication port 24 is equal to or more than the second specified value.

The incomplete ECU is an in-vehicle ECU 60 in which the relay device 10 has not yet received the updated data from the providing device 200. The first specified value is determined in advance as a capacity in which there is still a sufficient margin until the port storage area 21P reaches the full capacity. The second specified value is determined in advance as a rate of increase at which the data stored in the port storage area 21P is expected to be quickly sent and erased. The second memory 22 stores the first specified value and the second specified value in advance.

The CPU 20 determines whether the first port is present by determining whether the conditions (A1) to (A3) is satisfied for each communication port 24. In determining whether the condition (A1) is satisfied, the CPU 20 refers to the updated data list and the connected ECU information.

The CPU 20 can determine whether the condition (A1) is satisfied by combining these pieces of data. With regard to the determination of whether the condition (A2) is satisfied, the CPU 20 compares the most recent free space in the respective port storage area 21P with the first specified value. Based on the comparison, the CPU 20 determines whether the condition (A2) is satisfied. Regarding the determination of whether the condition (A3) is satisfied, the CPU 20 first calculates a rate of increase in free space in each port storage area 21P based on the transition of the free space in each port storage area 21P. The rate of increase in free space takes a positive or negative value. The rate of increase in free space is a positive value when the free space increases in the change in free space. The rate of increase in free space becomes a negative value when the free space is decreasing in the change in free space. For example, the CPU 20 can calculate the rate of increase in free space by dividing the value obtained by subtracting the value of the previous timing from the value of the subsequent timing by the time interval of the two timings with respect to the free space of the two consecutive timings. The CPU 20 calculating the rate of increase in free space corresponds to the CPU 20 acquiring the rate of increase in free space. The CPU 20 compares the most recent value of the rate of increase in free space in the respective port storage area 21P with the second specified value to determine whether the condition (A3) is satisfied.

When the first port is present in the plurality of communication ports 24 (S30: YES), the CPU 20 identifies the communication port 24 determined to be the first port as the preferential communication port. After that, the CPU 20 advances the process to S40. With regard to S30 process, there may be a plurality of communication ports 24 that satisfy the condition of the first port among the plurality of communication ports 24. In this instance, the CPU 20 identifies one of the plurality of communication ports 24 as the preferred communication port. For example, the CPU 20 sets the communication port 24 corresponding to the port storage area 21P whose most recent rate of increase in free space is the largest the out of the plurality of communication ports 24 satisfying the condition of the first port as the preferential communication port.

On the other hand, in S30, when the first port is not present in the plurality of communication ports 24 (S30: NO), the CPU 20 advances the process to S35. In S35, the CPU 20 selects, from among the plurality of communication ports 24, a second port that is the communication port 24 that satisfies a predetermined criterion. The second port is a communication port 24 that satisfies both of the following two conditions (B1), (B2) out of the plurality of communication ports 24.

(B1) The communication port 24 to which one or more incomplete ECU are connected.

(B2) The communication port 24 has the lowest current rate of increase in free space in the port storage area 21P corresponding to the communication port 24 among the communication ports 24 satisfying (B1).

The CPU 20 determines whether or not the condition (B1) is satisfied in the same manner as when determining whether or not the condition (A1) is satisfied. Then, the CPU 20 selects the second port satisfying the condition (B2) based on the latest value of the rate of increase in free space in the respective port storage areas 21P calculated by S30 process. When the CPU 20 selects the second port, it identifies the selected communication port 24 as the preferential communication port. After that, the CPU 20 advances the process to S40.

In S40, the CPU 20 determines the priority update data. The update data listed in the update data list, which is the destination of the in-vehicle ECU 60 connected to the preferential communication port specified by S30 or S35, is referred to as selection target data. In S40, the CPU 20 determines, as the priority update data, the update data having the largest data volume among the selection target data listed in the update data list at the present time. The CPU 20 determines the priority update data by referring to the update data list and the connected ECU information. When the CPU 20 determines the priority update data, the process proceeds to S50. Here, the priority communication port on which the priority update data is to be determined is selected based on the rate of increase in free space in the port storage area 21P. In the present S40, the CPU 20 determines the priority update data based on the data volume of the update data with respect to the priority communication port. That is, the CPU 20 determines the update data to be received out of the update data included in the update data list based on the data volume of the update data and the rate of increase in free space in the port storage area 21P to be the priority update data.

In S50, the CPU 20 sends the priority update data selected by S40. Specifically, the CPU 20 sends the transmission request data to the providing device 200. The transmission request information includes an ECU identification value of the in-vehicle ECU 60 to which the priority update data selected by S40 is applied, and a signal indicating that the transmission of the update data is requested. When the CPU 20 sends the transmission request-information, the process proceeds to S60. As illustrated in FIG. 2, upon receiving the transmission request data, the providing device 200 sends the updated data of the requested in-vehicle ECU 60 to the relay device 10 (S300).

As illustrated in FIG. 3, in S60, the CPU 20 performs a storage process. Specifically, the CPU 20 receives the update data sent from the providing device 200. Then, the CPU 20 stores the received updated data in one of the port storage areas 21P in the first memory 21. At this time, the CPU 20 identifies the communication port 24 to which the update data is to be sent, based on the destination information attached to the received update data and the connected ECU information. Then, the CPU 20 stores the updated data in the port storage area 21P corresponding to the communication port 24. When storing the update data in the port storage area 21P, the CPU 20 adds the current date and time to the update data. In addition to the above, the CPU 20 performs the following process only when the second port is identified as the preferential communication port. In other words, the CPU 20 rewrites the transmission priority level data attached to the updated data. Specifically, the CPU 20 rewrites the transmission priority level of the update data to the highest level among a plurality of predetermined stages. When the above-described storage processing is performed, the CPU 20 advances the processing to S70.

In S70, the CPU 20 edits the updated data list. Specifically, the CPU 20 erases the specific data set for the update data stored in S60 from among the specific data sets for each update data listed in the update data list. After that, the CPU 20 advances the process to S80. Each time the CPU 20 processes S70, one particular data set in the updated data list is deleted.

In S80, the CPU 20 determines whether update data of all the in-vehicle ECU 60 mounted on the vehicle 100 has been completed. Specifically, the CPU 20 refers to the updated data list. Then, when one or more specific data sets remain in the update data list, the CPU 20 determines that the acquisition of the update data has not been completed (S80: NO). The CPU 20 then returns to S30 process. On the other hand, the CPU 20 determines that it has completed acquiring the updated data if no specific data set remains in the updated data list (S80: YES). In this instance, the CPU 20 proceeds to S90.

In S90, the CPU 20 determines whether transmission of the update data for all the in-vehicle ECU 60 mounted on the vehicle 100 has been completed. The CPU 20 checks whether or not the updated data remains in each port storage area 21P based on the type data attached to the data stored in each port storage area 21P. When the update data remains in the one or more port storage areas 21P, the CPU 20 determines that the transmission of the update data is not completed (S90: NO). In this situation, the CPU 20 executes S90 process again. On the other hand, if no updated data remains in all the port storage areas 21P (S90: YES), the CPU 20 terminates the series of processes of the parallel reprogramming process.

Operations of Embodiment

The entire flow of the process performed by the CPU 20 will be described. In S50 of the parallel reprogramming process, the CPU 20 requests to send updated data for one in-vehicle ECU 60. Then, in S60, the CPU 20 stores the updated data received from the providing device 200 in a predetermined port storage area 21P. The predetermined port storage area 21P is a port storage area 21P corresponding to the communication port 24 to which the destination in-vehicle ECU 60 is connected. The CPU 20 repeats the request to send the update data and the storage of the update data by the update data of all the in-vehicle ECU 60 mounted on the vehicle 100 (S30-S80). In parallel with such repetition, the CPU 20 performs a transmission/reception process for each port storage area 21P. Through the transmission and reception process for each port storage area 21P, the CPU 20 sequentially sends the updated data stored in the respective port storage areas 21P. Through such a series of processes, the CPU 20 performs the above-described reprogramming process for a plurality of in-vehicle ECU 60 in parallel. The in-vehicle ECU 60 receives the update data sent to the in-vehicle communication line 70 via the communication port 24. The in-vehicle ECU 60 refers to the destination data attached to the respective data, and thereby can grasp the data that is sent to the in-vehicle ECU 60. Upon receiving the update data, the in-vehicle ECU 60 reconstructs their programs based on the received update data.

Effects of Embodiment (1) The maximum communication speed that can be realized by the internal communication line 70 connected to each communication port 24 is increased or decreased in accordance with the standard of the internal communication line 70. When the CPU 20 sends the data stored in the respective port storage areas 21P by the transmission/reception process, it waits for the data to be sent under a predetermined condition. The predetermined state is a state in which message data is sent from the in-vehicle ECU 60 to the communication port 24 and the in-vehicle communication line 70 to be sent. The speed at which the CPU 20 can deal with the data of the respective port storage areas 21P through the transmission and reception process for each port storage area 21P changes due to the difference in the communication speed according to the standard, the transmission frequency of the message data, and the like. This speed is reflected in the rate of increase in free space for each port storage area 21P.

In view of the above, the CPU 20 of the present embodiment acquires the transition of the free space in the respective port storage area 21P and thus the rate of increase in free space during the parallel reprogramming process. Then, the CPU 20 selects the priority communication port on which the priority update data for requesting the providing device 200 to send is to be selected based on the information related to the free space. Thus, by selecting the priority communication port while observing the free space in each port storage area 21P, it is possible to select the priority communication port in view of the communication status of the communication port 24 and the internal communication line 70 corresponding to each port storage area 21P. Further, the CPU 20 selects the priority update data based on the data volume of the respective update data. In this case, for example, unlike the case where the providing device 200 sends the randomly selected update data to the relay device 10, the CPU 20 itself can select the update data to be acquired in consideration of the data volume of the respective update data. Through these processes, the CPU 20 can relay the updated data in such a manner that the port storage areas 21P will not run out of space. Therefore, it is possible to reduce or eliminate the risk that the update data that has not been sent may be erased.

(2) When selecting the priority communication port, the CPU 20 of the present embodiment selects the first port as the priority communication port when the first port is present (S30: YES). The first port tends to be able to efficiently perform data transmission at the present time. For example, such a tendency is caused by the fact that the communication speed of the internal communication line 70 connected to the first port on the standard is high and the frequency of transmission of message data through the internal communication line 70 is low. By selecting the first port as the priority communication port and determining the priority update data, the following can be performed. That is, the update data received from the providing device 200 can be quickly sent to the internal communication line 70 and thus to the in-vehicle ECU 60 to be updated without staying in the port storage area 21P.

(3) Unlike the first port, the second port tends to: That is, the second port tends to be unable to efficiently send data from the relay device 10 at the present time. For example, the communication speed of the internal communication line 70 connected to the second port is slow, and the message data is continuously sent through the internal communication line 70, and the like, and thus, the tendency becomes such. Each in-vehicle ECU 60 in the vehicle connected to the second port is often delayed in sending the updated data.

When there is no first port (S30: NO), the CPU 20 of the present embodiment selects the second port as the preferential communication port (S35). Then, in this way, after determining the priority update data corresponding to the second port by identifying the second port based on the rate of increase in free space being the lowest, the CPU 20 performs the following in the storage process of S60. That is, when the update data is stored in the port storage area 21P, the CPU 20 rewrites the transmission priority level of the update data to the highest level among the plurality of stages. Consequently, the CPU 20 sends the updated data to the in-vehicle ECU 60 in preference to the message data in the transmission and reception process. As described above, by forcibly sending the update data to the in-vehicle ECU 60, it is possible to prevent the parallel reprogramming process from being cancelled because it takes a long time to send all the update data.

(4) When determining the priority update data in S40, the CPU 20 of the present embodiment selects one having the largest data volume of the update data as the priority update data. In this case, with respect to a plurality of pieces of update data to be stored in one port storage area 21P, the CPU 20 requests update data from the providing device 200 in descending order of data volume. In this case, the following is possible. Now, it is assumed that the CPU 20 receives update data having a large data volume from the providing device 200 and stores the update data in the port storage area 21P. Thereafter, while the CPU 20 is sending the update data, it is possible to start the storage process for the update data by requesting the subsequent update data to be sent. As described above, the CPU 20 can perform some processes in parallel with each other while shifting the transmission and reception of the plurality of updated data. Therefore, the parallel reprogramming process can be efficiently performed as a whole.

Modifications

The above embodiment can be implemented with the following modifications. The above embodiments and the following modifications can be combined with each other within a technically consistent range to be implemented.

The relay device 10 may be configured to receive updated data for each in-vehicle ECU 60 from the providing device 200 instead of the wired one.

The vehicle 100 and the providing device 200 may be configured so that the start switch 90 can be switched to the ON state in response to a signal from the providing device 200.

With regard to S40, it is not essential to determine the priority update data in descending order of the data volume.

Regarding S60, when the second port is identified as the priority communication port, it is not essential to rewrite the transmission priority level to the highest level.

Regarding S35, as a condition of the second port, in addition to the above (B1) (B2), a condition relating to the current amount of free space in the port storage area 21P corresponding to the communication port 24 may be added.

S35 may be discontinued. In this case, it is conceivable that a situation where each communication port 24 satisfies the condition of the first port is visited by, for example, adjusting the setting of the transmission frequency of message data.

S30 may be discontinued. That is, it is not essential to determine the presence or absence of the first port or to specify the first port as the priority communication port. Regardless of the presence or absence of the first port, the priority update data may be determined as appropriate based on the rate of increase in free space in each port storage area 21P and the data volume of each update data so that the port storage areas 21P will not run out of space.

The respective port storage areas 21P may be configured as separate memories.

What is claimed is:

1. A data relay device for a vehicle, the data relay device comprising:

a plurality of communication ports to which in-vehicle electronic control units are connected, and configured to receive update data for each in-vehicle electronic control unit of the in-vehicle electronic control units from a providing device;

an execution unit; and storage areas for each communication port of the communication ports, wherein:

the execution unit is configured to:

execute a reprogramming process on the in-vehicle electronic control units in parallel, the reprogramming process being a process of temporarily storing the update data in a storage area, and sending the update data stored in the storage area to a corresponding in-vehicle electronic control unit via a corresponding communication port, the corresponding communication port being connected to the corresponding in-vehicle electronic control unit, receive a list of pieces of the update data that have not been sent to the in-vehicle electronic control units, receive data volumes of the pieces of the update data that have not been sent to the in-vehicle electronic control units respectively, acquire rates of increase in free space of each storage area of the storage areas during the reprogramming process, identify a first communication port as a priority communication port from the communication ports, the first communication port corresponding to a first storage area having a free space equal to or more than a predetermined first specified value and having a rate of increase in the free space equal to or more than a predetermined second specified value, in a case where no first communication port is identified, identify a second communication port as the priority communication port, the second communication port corresponding to a second storage area having a lowest rate of increase in the free space among the storage areas, determine, from the list, a first piece of the update data to be priority update data, based on the data volumes and the rates of increase in the free space, the first piece of the update data being data to be sent to a first in-vehicle electronic control unit, the first in-vehicle electronic control unit being connected to the identified priority communication port, in a case where the priority communication port is identified and the priority update data is determined based on the lowest rate of increase in the free space, send the priority update data to the in-vehicle electronic control units in preference to other data, and send a signal requesting the priority update data to the providing device.

* * * * *